(12) United States Patent
Flatt et al.

(10) Patent No.: US 8,230,750 B2
(45) Date of Patent: Jul. 31, 2012

(54) ELECTROMECHANICAL ACTUATING ASSEMBLY

(75) Inventors: James E. Flatt, Foothill Ranch, CA (US); David J. Gurrola, Fillmore, CA (US); Bruce W. Behar, Pasadena, CA (US); Dan T. Nguyen, Irvine, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 589 days.

(21) Appl. No.: 12/393,304

(22) Filed: Feb. 26, 2009

(65) Prior Publication Data

US 2010/0213311 A1 Aug. 26, 2010

Related U.S. Application Data

(63) Continuation of application No. PCT/US2007/077507, filed on Sep. 4, 2007.

(60) Provisional application No. 60/824,371, filed on Sep. 1, 2006.

(51) Int. Cl.
*F16H 29/20* (2006.01)

(52) U.S. Cl. ............... 74/89.38; 74/89.39; 74/89.28; 74/89.29; 244/99.2

(58) Field of Classification Search ............ 244/231, 244/99.2, 99.3, 99.4; 74/496, 424.8 R, 424.8 B, 74/89.15, 459, 424.81, 424.82, 424.83, 424.84, 74/424.85, 424.86, 424.87, 424.88, 89.23, 74/89.37, 89.38, 89.39, 89.14, 89, 425, 458, 74/10.85, 89.25, 89.29, 424, 661, 665 R, 74/89.3; 192/141

See application file for complete search history.

(56) References Cited

U.S. PATENT DOCUMENTS

| 3,958,779 A | 5/1976 | Townsend |
| 4,544,052 A | 10/1985 | Borden |
| 4,575,027 A | 3/1986 | Cronin |
| 4,608,527 A | 8/1986 | Glennon et al. |
| 4,637,272 A * | 1/1987 | Teske et al. ............ 74/89.26 |
| 4,877,120 A | 10/1989 | Tysver et al. |
| 4,885,939 A | 12/1989 | Martin |
| 4,932,613 A | 6/1990 | Tiedeman et al. |

(Continued)

FOREIGN PATENT DOCUMENTS

GB 1393758 5/1975

OTHER PUBLICATIONS

PCT/US2008/053273; PCT International Search Report dated Jun. 5, 2009.

(Continued)

*Primary Examiner* — Timothy D Collins
*Assistant Examiner* — Nicholas McFall
(74) *Attorney, Agent, or Firm* — Renner, Otto, Boisselle & Sklar, LLP (57) ABSTRACT

An electromechanical actuating assembly can have a redundant design with a first electric motor providing actuator-moving power via a first drive train and a second electric motor providing actuator-moving power via a second drive train. A first decoupling train can transmit decoupling power to decouple the first drive train from the actuator and a second decoupling train for transmit decoupling power to decouple the second drive train from the actuator. The assembly is operable in a fault-tolerant mode wherein actuator-moving power is transferred only through one drive train and the other drive train is decoupled from the actuator.

18 Claims, 12 Drawing Sheets

U.S. PATENT DOCUMENTS

| | | | |
|---|---|---|---|
| 4,979,700 | A | 12/1990 | Tiedeman et al. |
| 5,071,397 | A | 12/1991 | Grimm |
| 5,120,285 | A | 6/1992 | Grimm |
| 5,144,851 | A | 9/1992 | Grimm et al. |
| 5,214,972 | A | 6/1993 | Larson et al. |
| 5,518,466 | A | 5/1996 | Tiedeman |
| 5,779,587 | A | 7/1998 | Reilly |
| 5,947,246 | A | 9/1999 | Koller |
| 6,231,012 | B1 | 5/2001 | Cacciola et al. |
| 6,260,799 | B1 | 7/2001 | Russ |
| 6,443,034 | B1 | 9/2002 | Capewell et al. |
| 6,705,570 | B1 | 3/2004 | Degenholtz et al. |
| 6,860,452 | B2 | 3/2005 | Bacon et al. |
| 7,100,870 | B2 | 9/2006 | Flatt |
| 7,410,132 | B1 | 8/2008 | Flatt |
| 2003/0015982 | A1 | 1/2003 | Cox-Smith et al. |
| 2003/0127569 | A1 | 7/2003 | Bacon et al. |
| 2004/0007923 | A1 | 1/2004 | Tesar |
| 2006/0048602 | A1 | 3/2006 | Biester |
| 2006/0113933 | A1* | 6/2006 | Blanding et al. .............. 318/116 |

OTHER PUBLICATIONS

PCT/US2007/077507; Partial International Search mailed Jun. 15, 2009.

* cited by examiner

Figure 6E

ELECTROMECHANICAL ACTUATING ASSEMBLY

RELATED APPLICATIONS

This application claims priority under 35 U.S.C. §120 to International Application No. PCT/US2007/077507 filed on Sep. 4, 2007, which claimed priority to U.S. Provisional Patent Application No. 60/824,371 filed on Sep. 1, 2006. The entire disclosures of these earlier applications are hereby incorporated by reference.

BACKGROUND

An aircraft commonly comprises control-surface components (e.g., stabilizers, rudders, elevators, flaps, ailerons, spoilers, slats, etc.) that are selectively moved during flight among a plurality of positions. Selective movement can be achieved by an actuating assembly comprising an actuator, to which the control-surface component is attached, and means for providing actuator-moving power to the actuator. Movement of aircraft control-surface components is crucial in flight, whereby an actuating assembly must consistently and dependably perform during normal operation. Moreover, the actuating assembly must be prepared to survive situations outside normal operation and/or to compensate for circumstances causing loss of actuator control.

SUMMARY

An electromechanical actuating assembly (i.e., an EMA assembly) is provided with a redundant design (i.e., dual electric motors powered by different electrical sources) whereby it is suitable for flight-control-surface components in aircraft applications. The EMA assembly can be adapted to survive jam-situations and/or to compensate for loss-of-power circumstances. Furthermore, these features can be testable whereby the EMA assembly's preparedness for non-normal operation may be verified before each flight.

DETAILED DESCRIPTION

Figure 1:
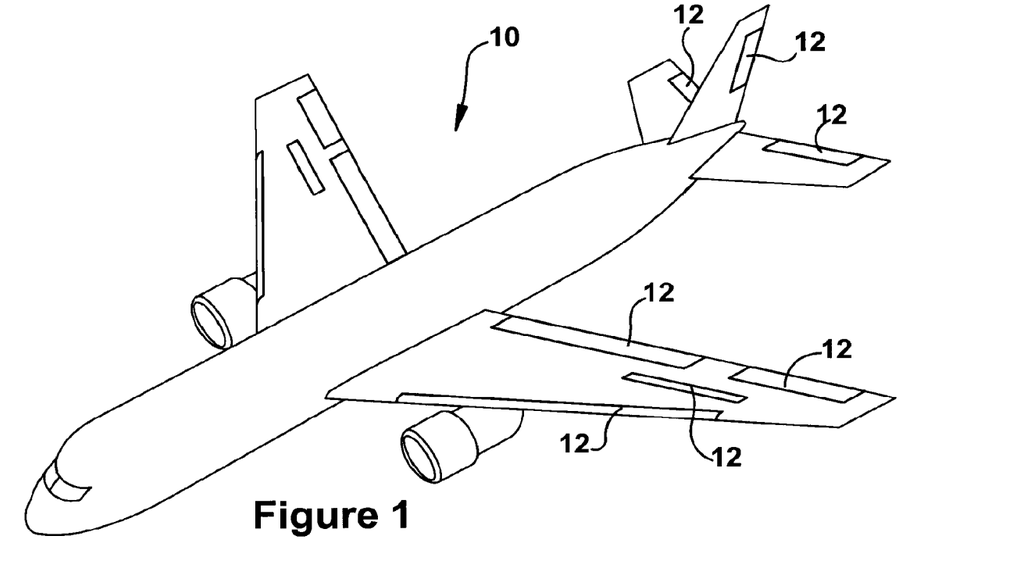
FIG. 1 shows an aircraft having flight-control-surface components which may be selectively moved by the EMA assembly.
Figure 2A:
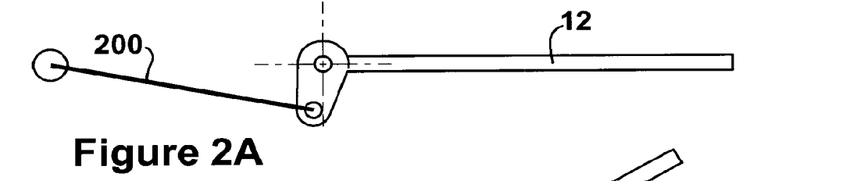
FIGS. 2A-2C show the movement of a flight-control-surface component by the EMA assembly.
Figure 2B:
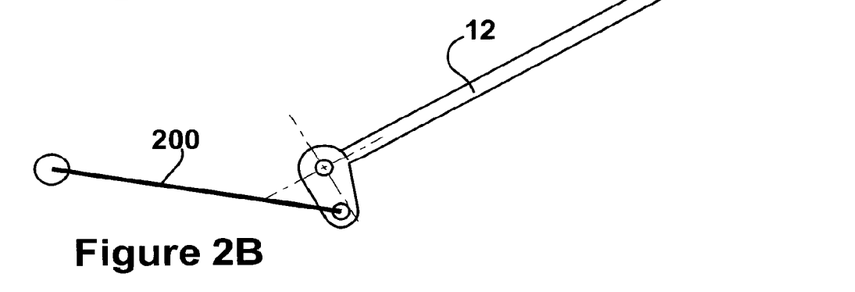
Figure 2C:
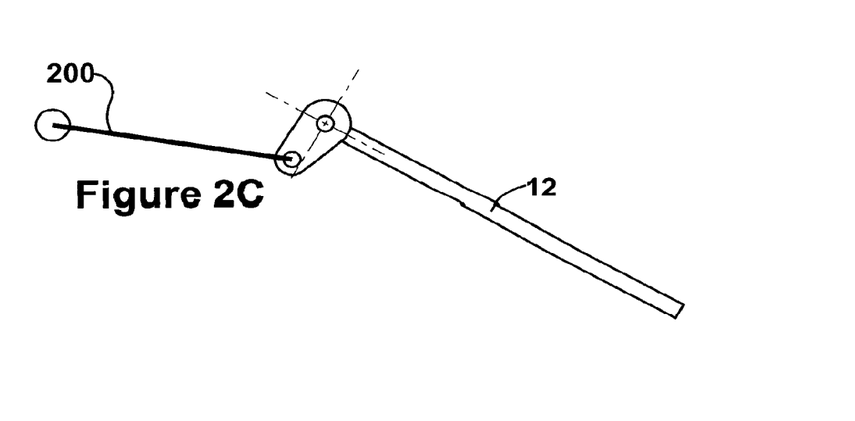

Referring now to the drawings, and initially to FIG. 1, an aircraft 10 is shown having flight-control-surface components 12 (e.g., stabilizers, rudders, elevators, flaps, ailerons, spoilers, slats, etc.) that are selectively moved during flight. As shown in FIGS. 2A-2C, an electromechanical actuating assembly 100 (i.e., an EMA assembly) is used to selectively move such a flight-control-surface component 12 among a plurality of positions. The EMA assembly 100 can have a redundant design whereby it is suitable for such flight-control-surface components 12 in an aircraft application.

Figure 3:
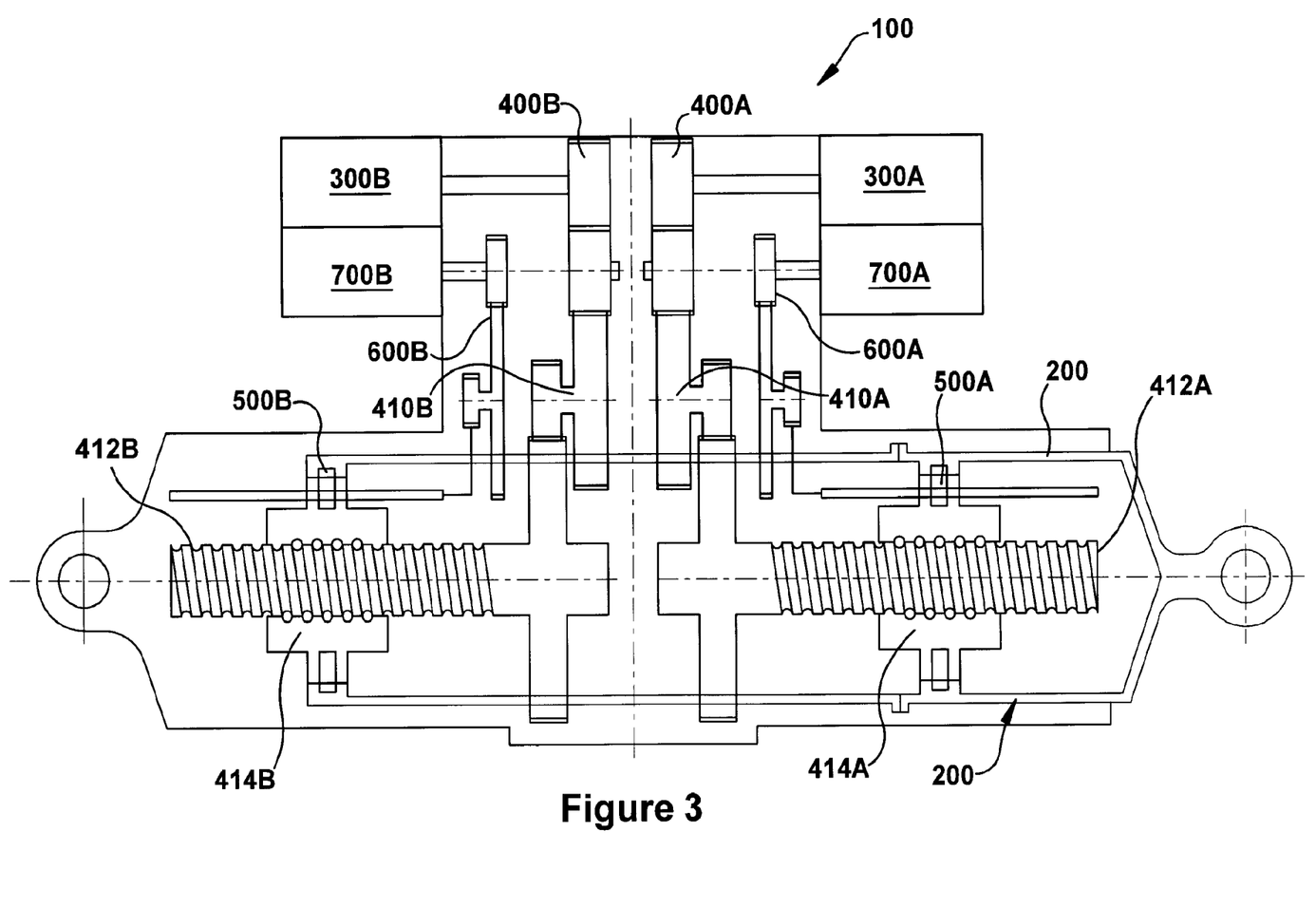
FIG. 3 is a diagram of another mechanical-electrical layout for the EMA assembly, wherein dedicated decoupling motors (separate from the drive motors) supply decoupling power.
Figure 4:
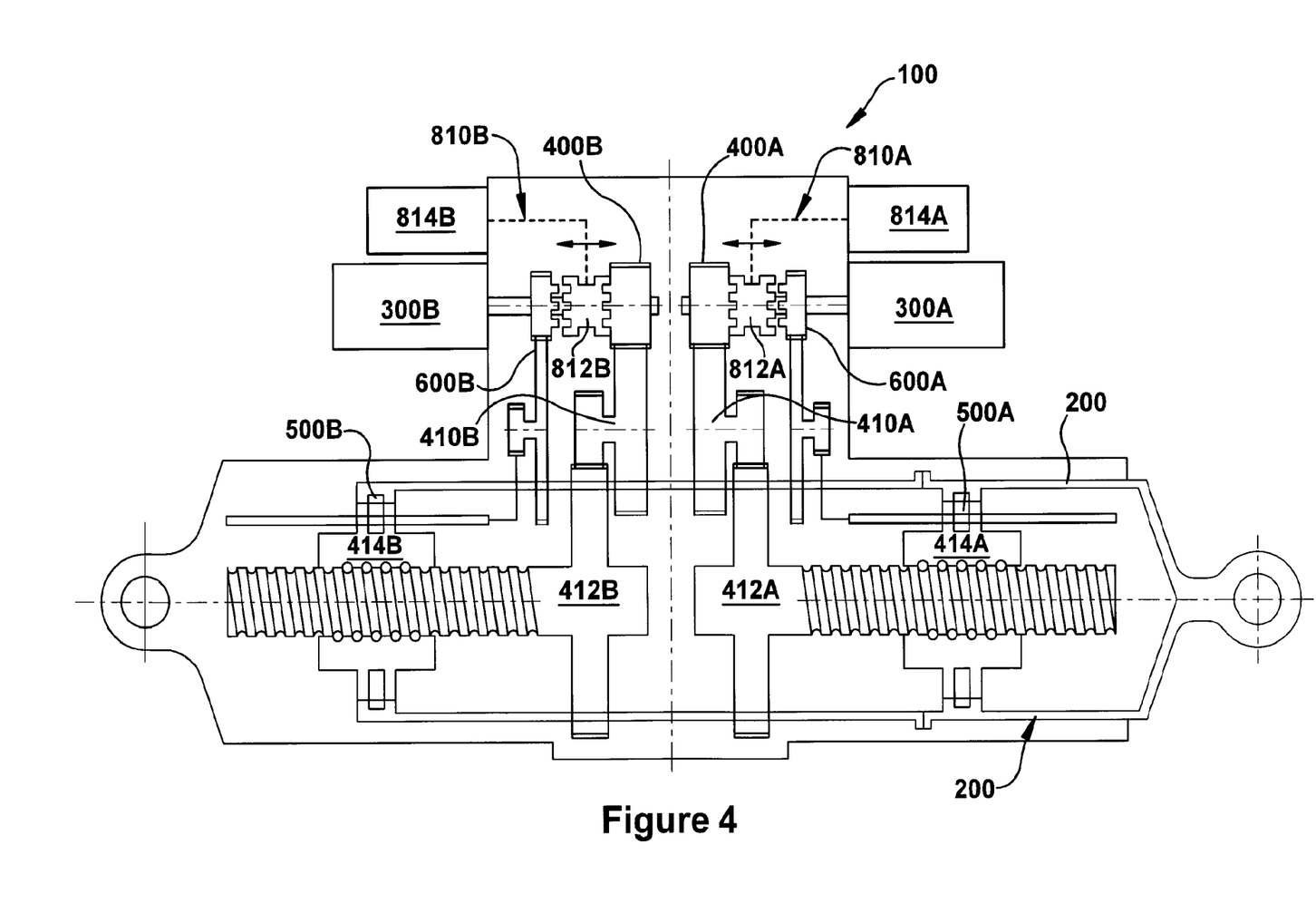
FIG. 4 is a diagram of a mechanical-electrical layout for the EMA assembly, wherein the drive motors also supply decoupling power.

Referring now to FIGS. 3 and 4, mechanical-electrical layout diagrams of the EMA assembly 100 are shown. The EMA assembly 100 comprises an actuator 200 having an output end for attachment to the component 12. The EMA assembly 100 also comprises a first motor 300A for providing actuator-moving power to the actuator 200, and a second motor 300B for providing actuator-moving power, independent of the first motor 300A, to the actuator. The motors 300A/300B can be powered by different electrical sources.

In the illustrated normal-operation mode, a first drive train 400A transfers actuating power from the first motor 300A to the actuator 200 and a second drive train 400B transfers actuating power from the second motor 300B to the actuator 200. The first drive train 400A (comprising a gear train 410A, a ballscrew 412A, and a ballnut 414A) is coupled to the actuator 200 via a first coupler 500A and the second drive train 400B (comprising a gear train 410B, a ballscrew 412B, and a ballnut 414B) is coupled to the actuator 200 via a second coupler 500B. Each coupler 500A/500B moves with the actuator 200 when it is coupled to the respective drive train 500A/500B. The couplers 500A/500B can preferably be repeatedly decoupled and recoupled (i.e., they have reversible decoupling capability).

The EMA assembly 100 further comprises a first decoupling train 600A for transmitting decoupling power to decouple the first drive train 400A from the actuator 200, and a second decoupling train 600B for transmitting decoupling power to decouple the second drive train 400B from the actuator 200. More specifically, the first decoupling train 600A decouples the first coupler 500A when decoupling power is transmitted therethrough and the second decoupling train 600B decouples the second coupler 500B when decoupling power is transmitted therethrough. Because the couplers 500 have reversible decoupling capabilities, pre-flight testing of the assembly's decoupling steps is possible. The couplers 500 can resemble the coupling-decoupling device disclosed in U.S. Pat. No. 7,100,870 (both the linear and rotary embodiments), or any other suitable coupling-decoupling structure.

In FIG. 3, dedicated decoupling motors 700A and 700B provide the decoupling power for transmission through the decoupling trains 600A and 600B, respectively. If, for example, a jam is detected in one of the drive trains 400, the appropriate decoupling motor 700 is activated. In one fault tolerant mode (the D1 mode), actuator-moving power is provided by only the first motor 300A and is transferred only through the first drive train 400A. Decoupling power provided by the second decoupling motor 700B is transferred through the second decoupling train 600B whereby the second drive train 400B is decoupled from the actuator 200.

In another fault tolerant mode (D2 mode), actuator-moving power is provided by only the second motor 300B and is transferred only through the second drive train 400B. Decoupling power provided by the first decoupling motor 700A is transferred through the first decoupling train 600A whereby the first drive train 400A is decoupled from the actuator 200.

In FIG. 4, the drive motors 300A and 300B provide drive power for the respective drive trains 400A and 400B and also provide decoupling power for the respective decoupling trains 600A and 600B. A first drive-decouple converter 810A (comprising a clutch 812A and a solenoid switch 814A) and a second drive-decouple converter 810B (comprising a clutch 812B and a solenoid switch 814B) are used to convert the EMA assembly 100 from the normal-operation mode to a fault-tolerant mode. The converters 810A/810B each converts between a drive condition (illustrated) and a decouple condition.

When the first drive-decouple converter 810A is in its drive condition, the first motor 300A is drivingly connected to the first drive train 400A by the clutch 812A. In the decouple condition, clutch 812A is moved (to the right in the illustrated orientation) to drivingly connect the first motor 300A to the first decoupling train 600A. Likewise, the clutch 812B drivingly connects the second motor 300B and the second drive train 400B when the converter 810B is in its drive condition, and the clutch 812B drivingly connects the second motor 300B and the second decoupling train 600B when the converter is in its decouple condition.

The first solenoid switch 814A motivates movement of the first clutch 812A and the second solenoid switch 814B motivates movement of the second clutch 812B. The solenoid 814A/814B can be energized in the drive condition and deenergized in the decouple condition. During normal operation, both converters 810A and 810B are in the drive condition, whereby the solenoids 814A/814B are energized throughout normal operation. Alternatively, the solenoids 814A/814B can be energized in the decouple condition and deenergized in the drive condition.

In one fault tolerant mode (D1 mode), the converter 810A is in its drive condition and the converter 810B is in its decouple condition. Actuator-moving power is provided by only the first motor 300A and is transferred only through the first drive train 400A. Decoupling power provided by the second motor 300B is transferred through the second decoupling train 600B whereby the second drive train 400B is decoupled from the actuator 200. In another fault tolerant mode (D2 mode), the converter 810A is in its decouple condition and the converter 810B is in its drive condition. Actuator-moving power is provided by only the second motor 300B and is transferred only through the second drive train 400B. Decoupling power provided by the first motor 300A is transferred through the first decoupling train 600A whereby the first drive train 400A is decoupled from the actuator 200.

Referring now to FIGS. 5A-5F, a predisposition device 900 is shown. The device 900 is directed to, and used in, situations wherein actuator-control cannot be accomplished by a drive system. This could occur, for example, if there is a loss of electrical power to all motors (thus no actuator-moving power is being generated). In a redundantly designed electromechanical actuating assembly, such as the EMA assembly 100 described above, the predisposition device 900 would be called into service if both the electric supply to the motor 300A was terminated and the electric supply to the motor 300B was terminated.

When actuator movement is not controlled by a drive system, external forces (e.g., air flow) on the component 12 will dictate movement and the result can resemble sporadic flapping. With the predisposition device 900, the actuator 200 (and thus the flight-control-surface component 12) can be held in a predetermined OPALOP ("optimum position after loss of power") position. The device 900 prevents movement of the actuator 200 in a direction away from this optimum position, and allows movement of the actuator 200 in a direction towards this optimum position. Thus, in the event of electrical power loss, an external force (e.g., air flow) on the component 12 can move the actuator 200 to the OPALOP position whereat it will remain until electrical operation resumes.

The OPALOP position can be the position whereat effects can be most effectively neutralized, control can be most quickly established, and/or compensation can be most easily accomplished.

Referring back briefly to FIGS. 2A-2C, the OPALOP position could be, for example, the non-tilted position shown in FIG. 2A, as opposed to the extreme positions shown in FIGS. 2B and 2C. In the illustrated embodiment, the OPALOP position is intermediate to the other actuator positions, whereby the actuator's return to the OPALOP position could be in one of two opposite directions. But this need not be the case, as the OPALOP position could be an endmost position, whereby the OPALOP return of the actuator 200 would always be in the same direction.

The illustrated OPALOP device 900 comprises an enabling mechanism 910. The mechanism 910 converts between an enabled condition whereat the device 900 is enabled for nonelectrical operation and a disabled condition whereat the predisposition device 900 is disabled for electrical operation. This conversion can be electrically motivated by, for example, the enabling mechanism 910 being energized during electrical operation and being deengergized during nonelectrical operation. If the enabling mechanism 910 is energized by a power source which also powers the electrical motors 300, loss of power to the electrical motors 300 will result in the enabling mechanism 910 being converted to the enabled condition.

In the illustrated embodiment, the enabling mechanism 910 comprises a solenoid 912 with a plunger 914 which moves during conversion between the enabled condition and the disabled condition. The plunger 914 can extend when the enabling mechanism 910 is its enabled condition and retract when the enabling mechanism 910 is in its disabled condition. For example, the plunger 914 can biased towards extension and energization of the solenoid 912 can cause plunge retraction.

The predisposition device 900 additionally comprises a ratchet-and-pawl mechanism 920. The enabling mechanism 910 situates the ratchet-and-pawl mechanism 920 in a nonengagable posture during electrical operation and in an engagable posture during nonelectrical operation. The conversion of the enabling mechanism 910 between its disabled condition and enabled condition causes this change in posture.

The ratchet-and-pawl mechanism 920 comprises a ratchet 922 and pawls 926 and 928. The ratchet 922 travels linearly with the actuator 200 and the pawls 926 and 928 are linearly stationary relative to a location corresponding to the placement of the actuator 200 in the OPALOP position. In the illustrated EMA assembly 100, the ratchet 922 can be incorporated into rails surrounding the ballscrews 412 and accommodating the connection of the gear trains 410 thereto. The pawls 926 and 928 can be pivotally attached to the solenoid plunger 914 for lever-like movement relative thereto.

The ratchet 922 includes a first series of teeth 930 on one linear side of the OPALOP position and a second series of teeth 932 on the other linear side of the OPALOP position. The first pawl 926 is shaped, sized, and situated for potential engagement with the first series of teeth 930. The second pawl 928 is shaped, sized, and situated for potential engagement with the second series of teeth 932.

Figure 5A:
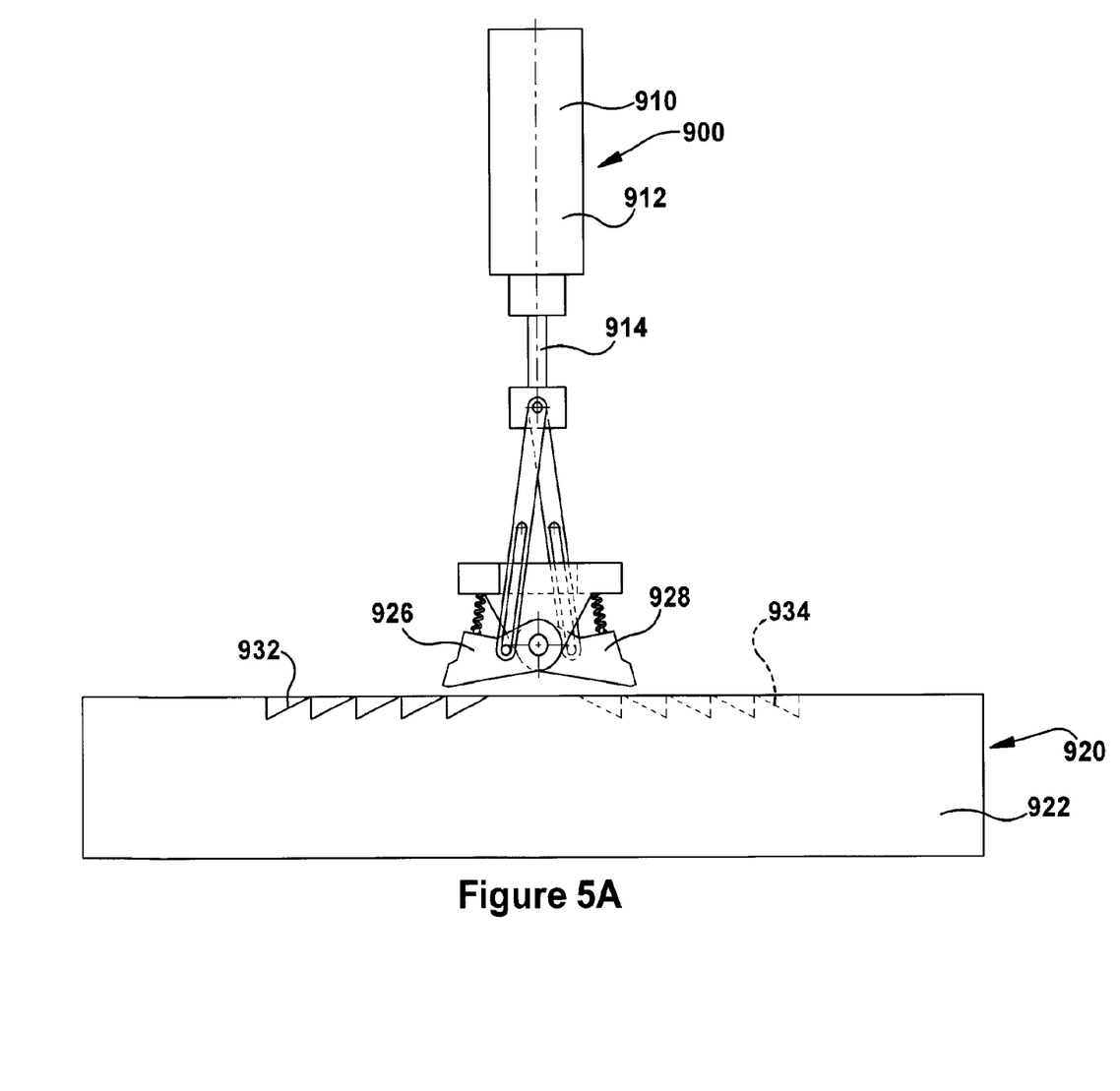
FIGS. 5A-5F are drawings of a predisposition device and relevant portions of the EMA assembly, this predisposition device interacting with a linearly-moving part of the EMA assembly during nonelectrical operation.

During electrical operation, the enabling mechanism 910 situates the ratchet 922 and the pawls 926/928, and thus the ratchet-and-pawl mechanism 930, in a nonengagable posture.

(FIG. 5A.) Specifically, in the illustrated embodiment, the retraction of the solenoid plunger 914 spaces the pawls 926/928 above the ratchet 922. Thus, as the actuator 200 moves the component 12 among the plurality of positions during electrical operation, the ratchet 922 and the pawls 926/928 do not interact.

During nonelectrical operation, the enabling mechanism 910 situates the ratchet 922 and the pawls 926/928, and thus the ratchet-and-pawl mechanism 930, in an engagable posture. (FIGS. 5B-5F.) In the illustrated embodiment, upon extension of the plunger 914, the pawls 926/928 are pressed into contact with the ratchet 922.

At the beginning of nonelectrical operation (e.g., just after a loss of power), the actuator 200 may be positioned to one side of the OPALOP position. In such cases, the first pawl 926 is engagable with the first series of teeth 930 or the second pawl 928 is engagable with the second series of teeth 932. The non-engagable pawl rides an untoothed surface of the ratchet 922, but is laterally offset from the corresponding series of teeth 930/932.

Figure 5B:
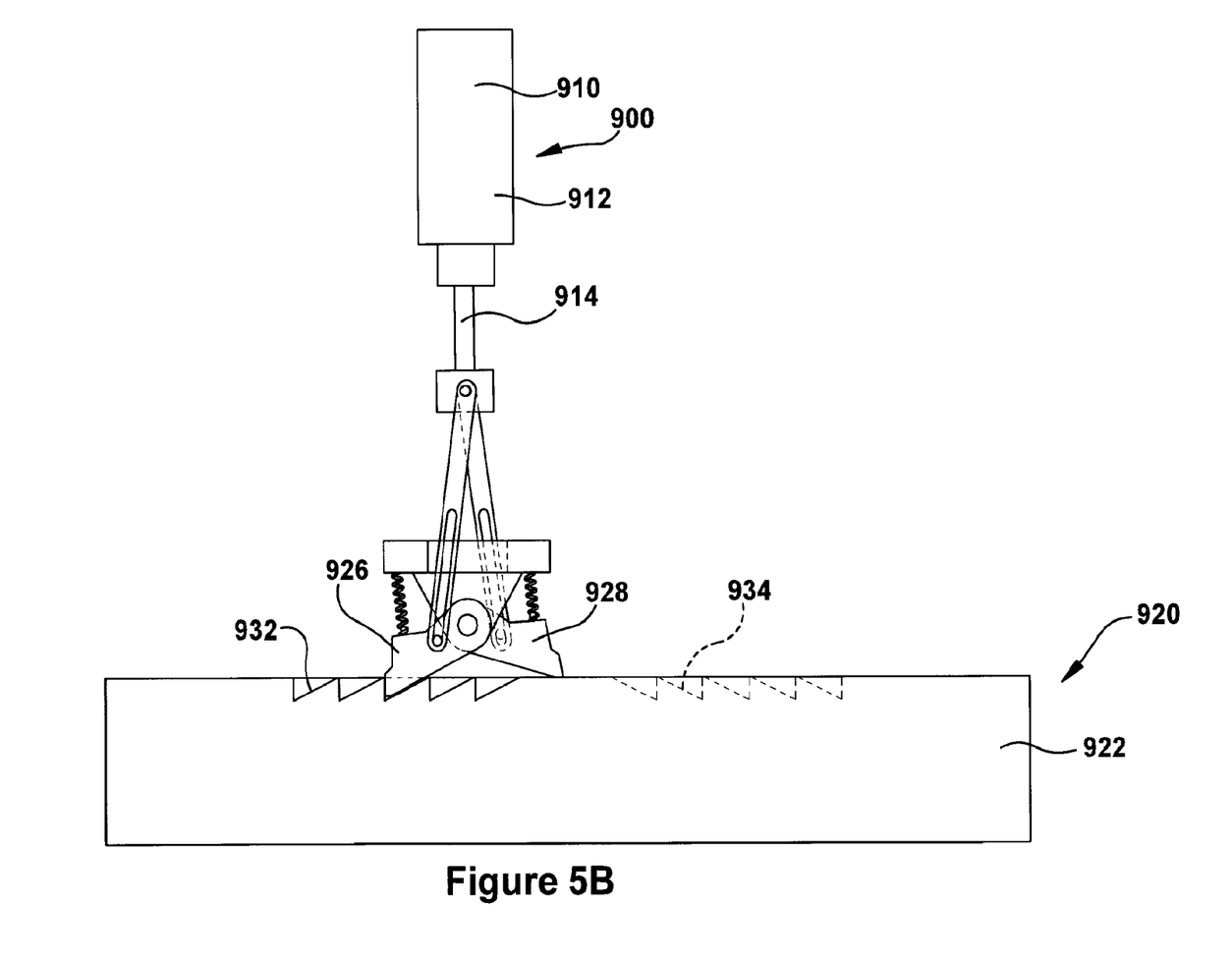
Figure 5C:
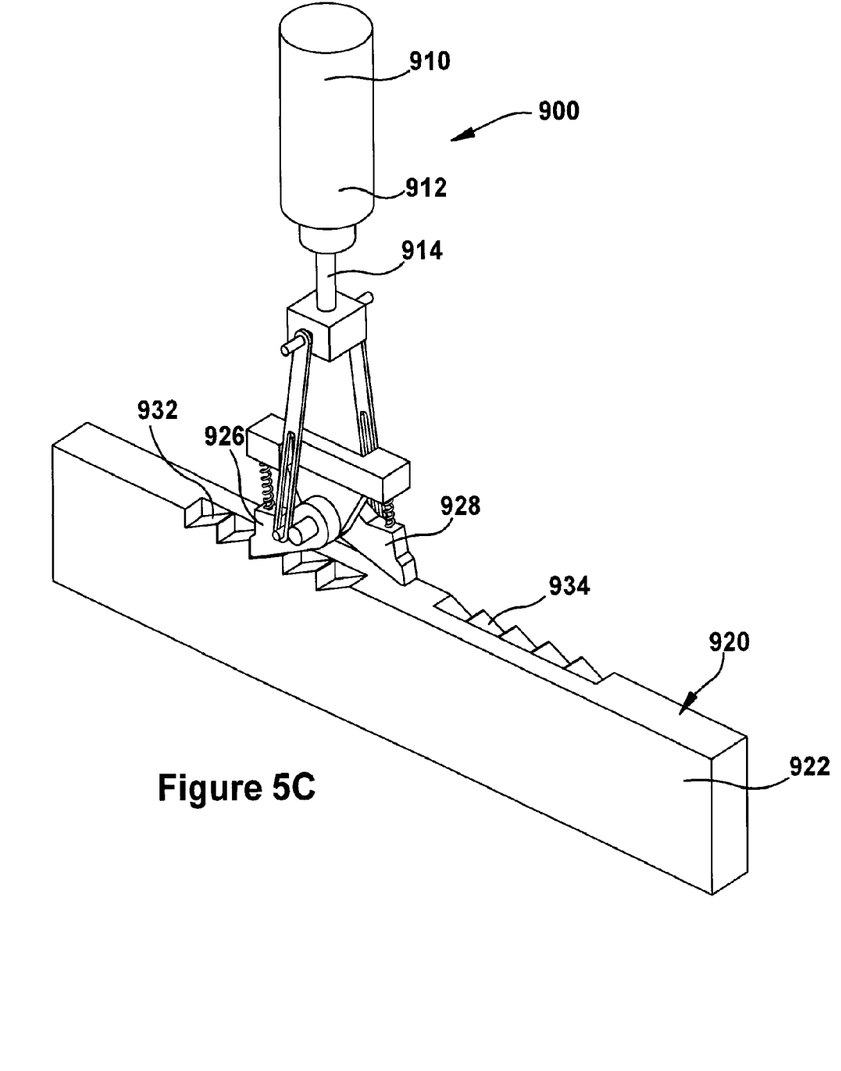

More particularly, the actuator 200 can be located leftward of the OPALOP position during nonelectrical operation. (FIGS. 5B and 5C.) In this case, the first pawl 926 is engaged with one of the first series of teeth 930 and the second pawl 928 rides on an untoothed surface of the ratchet 922. When an external force (e.g., air flow) on the component 12 is towards the OPALOP position, the first pawl 926 is pushed this way and slides over teeth 930 towards the OPALOP position (rightward). If an external force on the component 12 is away from the OPALOP position (leftward), the first pawl 926 is caught in the engaged tooth 930 and the actuator 200 is prevented from moving in this direction.

Figure 5D:
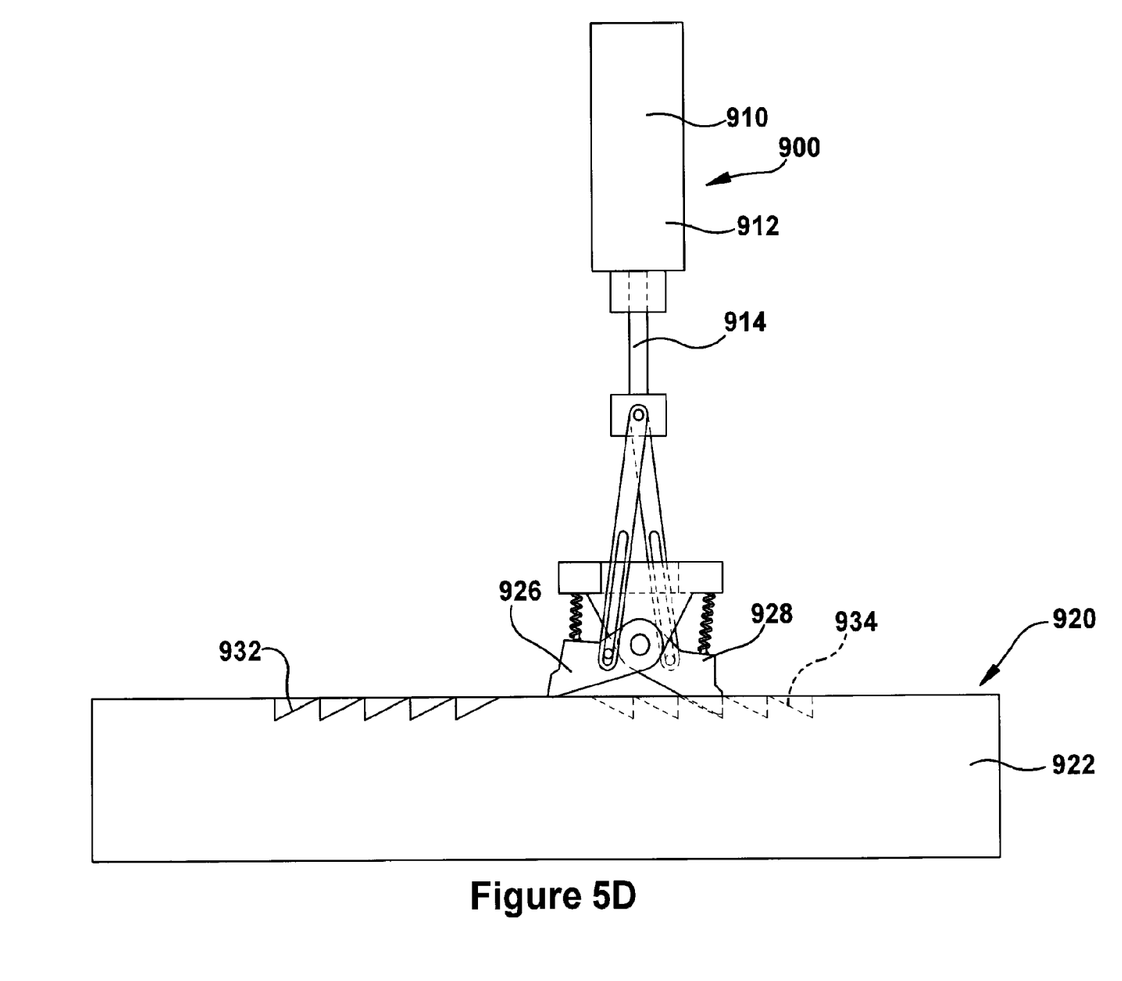
Figure 5E:
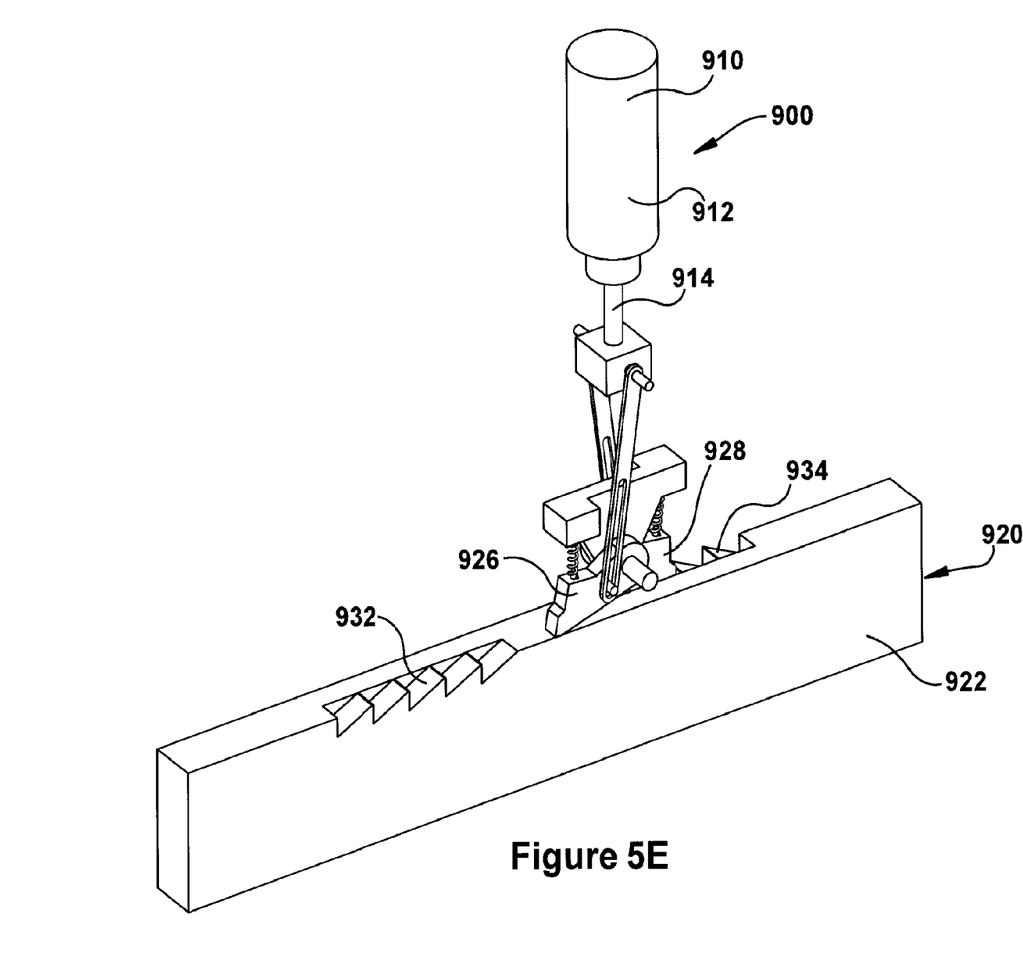

The actuator 200 can be located rightward of the OPALOP position during nonelectrical operation. (FIGS. 5D and 5E.) In this case, the first pawl 926 rides an untoothed surface of the ratchet 922 and the second pawl 928 can engage with one of the second series of teeth 932. In response to an external force on the component 12, the second pawl 928 can slide over the teeth 932 towards the OPALOP position (leftward) but its tooth-capture prevents movement away from the OPALOP position (rightward).

Figure 5F:
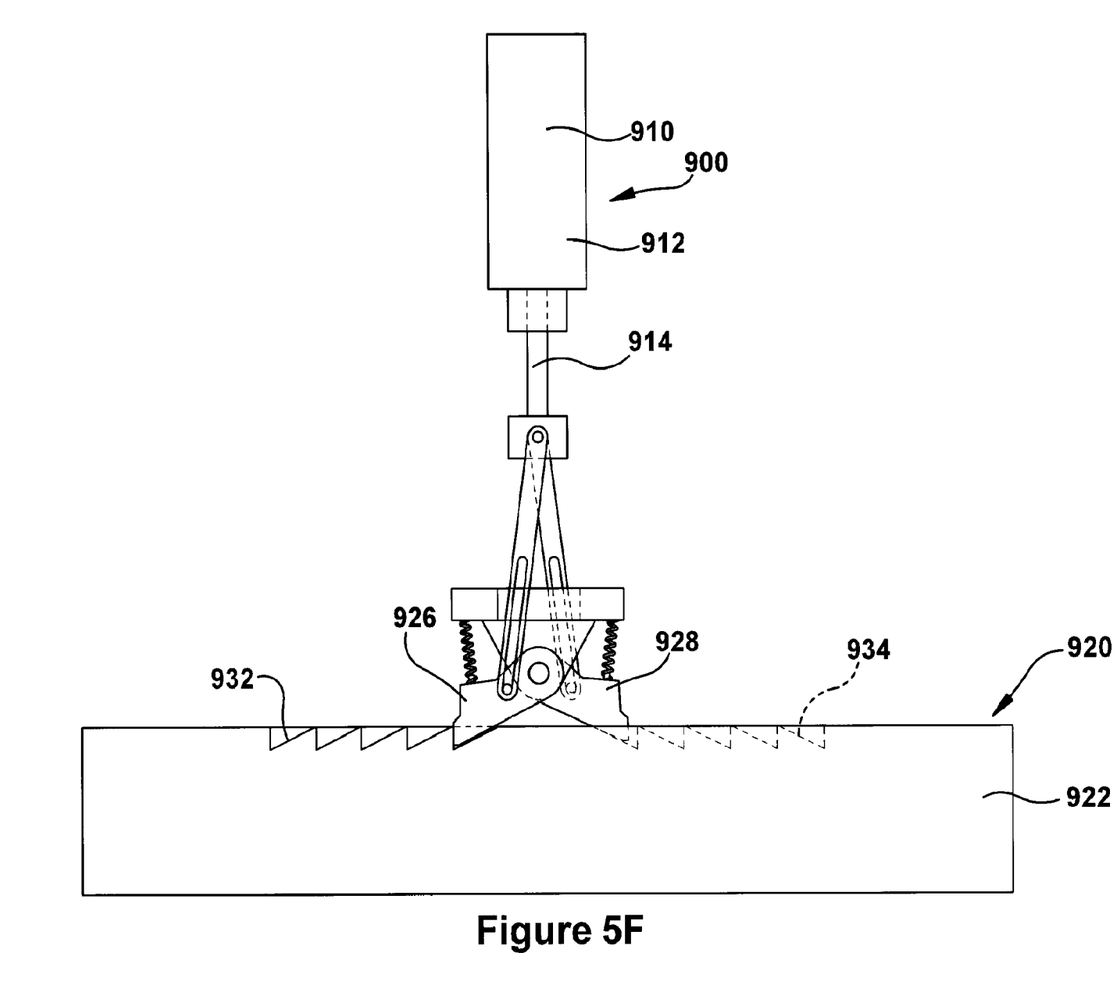

The actuator 200 can be located in the OPALOP position during nonelectrical operation. (FIG. 5F.) This can occur because, by happenstance, the actuator 200 was in this position at the end of electrical operation. Alternatively, the actuator 200 can be in OPALOP position during nonelectrical operation because of its ratchet movement in response to external forces on the component 12. In either or any event, the first pawl 926 can be engaged with the OPALOP-adjacent tooth 932 and the second pawl 928 can be engaged with the OPALOP-adjacent tooth 934. This two-pawl engagement locks the actuator 200 in the OPALOP position.

As was indicated above, the OPALOP position can correspond to the central, intermediate, or medium position, but it need not. An extreme, end, or outermost position could sometimes be the best position to assume upon loss of electrical power. In this case, only one series of teeth may be necessary for actuator return, but two pawls may be desired to incorporate a locking feature. Whatever the OPALOP position, the predisposition device 900 can be designed to mechanically maneuver the actuator 200, and thus the component 12, back to this optimum position, regardless of its location at the time of a power loss.

Referring now to FIG. 6A-6D, another predisposition device 900 is shown, this device 900 being adapted for use on a rotating shaft (e.g., motor shaft, gear shaft, drive shaft, screw shaft, etc.) of an electromechanical actuating assembly.

The electromechanical actuating assembly can be one in which the actuator 200, and thus the component 12, moves linearly, such as the EMA assembly 100. Alternatively, the predisposition device 900 can be used in an electromechanical actuating assembly wherein the actuator 200, and thus the component 12, is rotated among a plurality of positions.

Figure 6A:
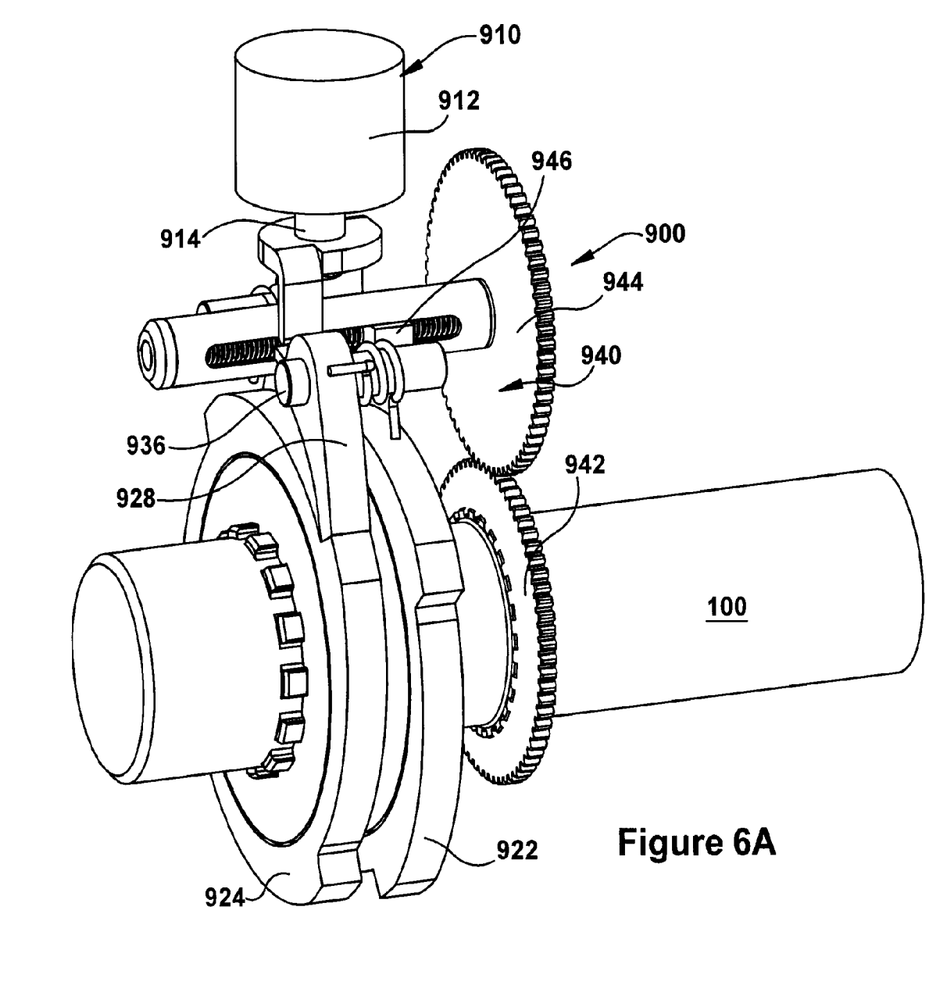
FIGS. 6A-6E are drawings of another predisposition device and relevant portions of the EMA assembly, this predisposition device interacting with a rotating part of the EMA assembly during nonelectrical operation.
Figure 6B:
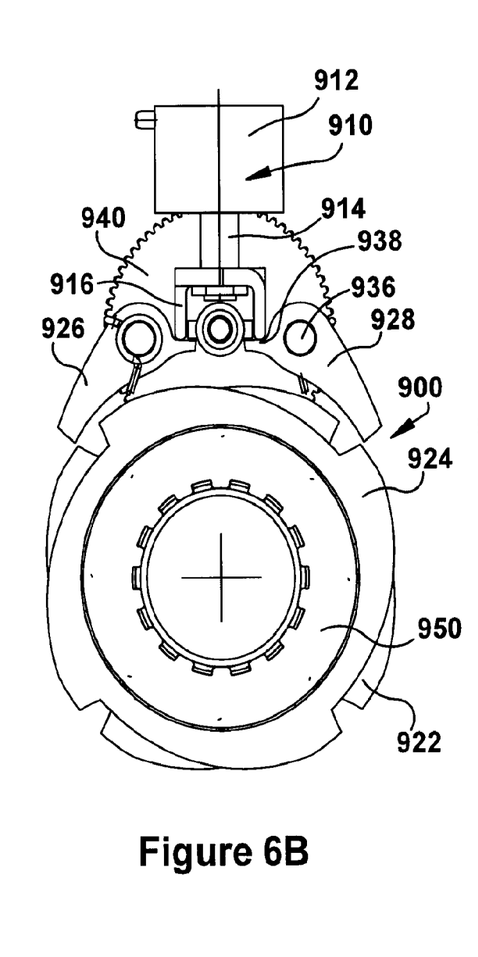
Figure 6C:
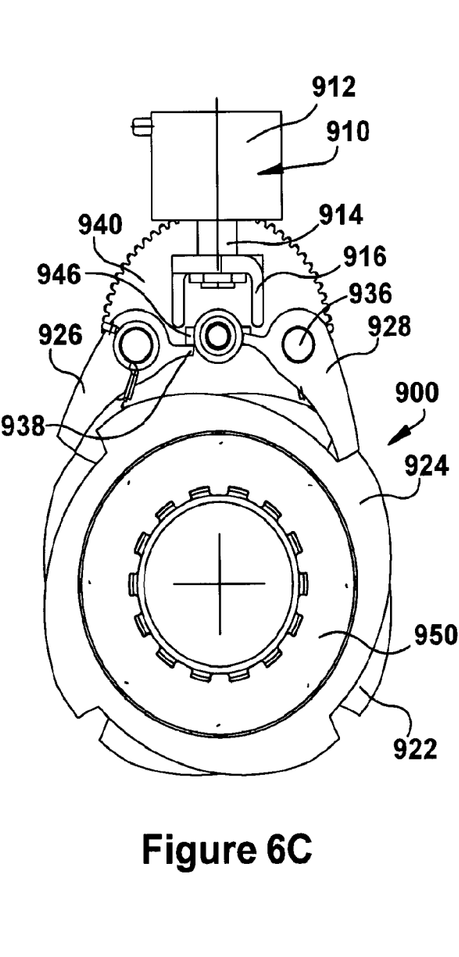
Figure 6D:
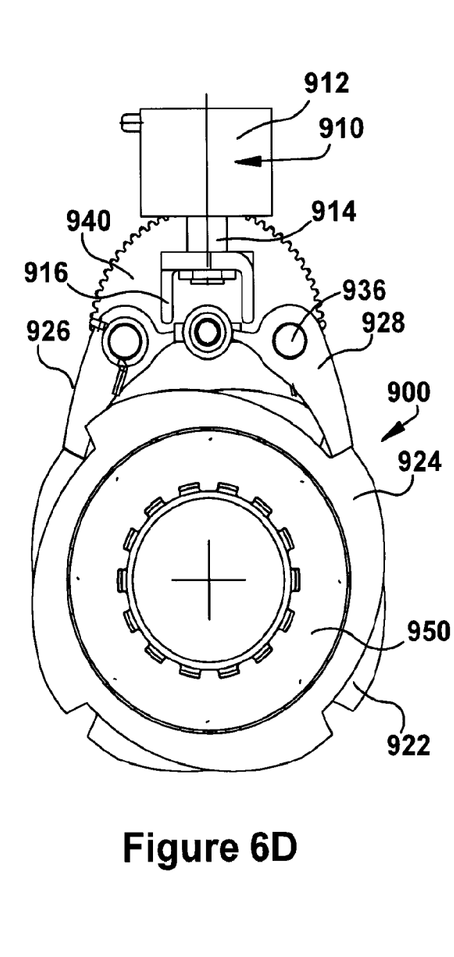
Figure 6E:
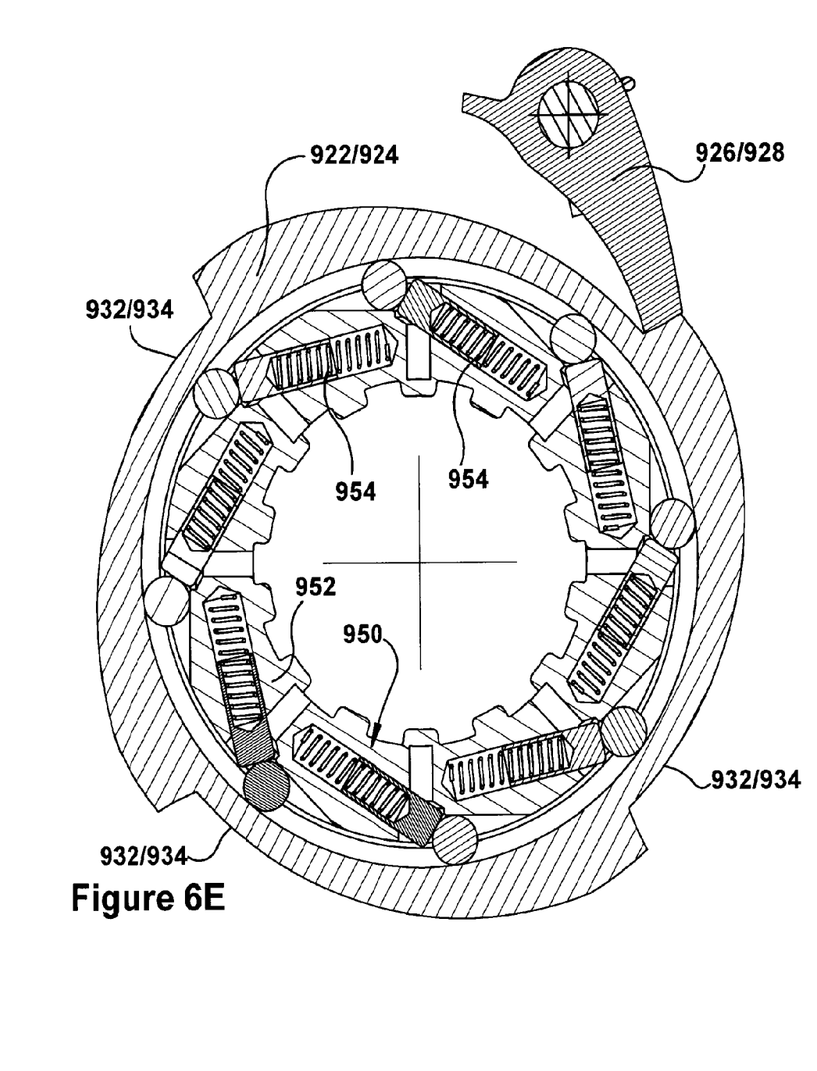

The rotary predisposition device 900 has an enabling mechanism 910 that allows conversion between a disabled condition (during electrical operation) and an enabled condition (during nonelectrical operation). The illustrated mechanism 910 comprises a solenoid 912, a plunger 914, and disabling arms 916 mounted on the plunger's end. In the disabled condition (FIG. 6B), the solenoid 912 is deenergized, and the plunger 914 is extended. (FIG. 6B.) In the enabled condition, the solenoid 912 is energized and the plunger 914 is retracted. (FIGS. 6A, 6C, and 6D.)

The rotary predisposition device 900 additionally comprises a ratchet-and-pawl mechanism 920 comprising a first ratchet wheel 922, a second ratchet wheel 924, a first pawl 926, and a second pawl 928. The ratchet wheels 922 and 924 are mounted side-by-side around, and rotate with, the relevant shaft of the EMA assembly 100. The first ratchet wheel 922 has teeth 930 ramped in the clockwise direction and the second ratchet wheel 924 has teeth 932 ramped in the counterclockwise direction.

The first pawl 926 is shaped, sized, and situated for potential engagement with the teeth 930 in the first ratchet wheel 922. The second pawl 928 is shaped, sized, and situated for potential engagement with the teeth 932 in the second ratchet wheel 924. In the illustrated device 900, the pawls 926 and 928 are pivotally mounted to separate rods 936, and are axially offset for alignment with the wheels 922 and 924, respectively. Each pawl 926/928 has a lever 938 for interaction with the enabling mechanism 910 (and also the mechanism 940, introduced below).

The predisposition device 900 further comprises a pawl-selecting mechanism 940. This mechanism 940 mechanically tracks the position of the actuator during nonelectrical operation, and based on this tracking, selects pawl 926 and/or pawl 928 for engagement with the respective ratchet wheel 922/924. If clockwise movement is required for return to the OPALOP position, the first pawl 926 is selected for engagement (or it is deselected for disengagement). If counterclockwise movement is required for return to the OPALOP position, the second pawl 928 is selected for engagement (or it is deselected for disengagement). If the OPALOP position has been obtained both pawls 926/928 are selected for engagement (or they are deselected for disengagement).

In the illustrated embodiment, the pawl-selecting mechanism 940 comprises a gear 942 that rotates with the relevant shaft, a gear 944 that rotates in response to the gear 942, and a selecting lug 946 that linearly moves in response to the gear 944. The lug 946 is located to interact with the lever arms 938 of the pawls 926/928 without interfering with the disabling arms 916 of the enabling mechanism 910. If the enabling mechanism 910 is in its disabled condition, the location of the selection lug 946 does not affect pawl position. (FIG. 6B.)

If only the first pawl 926 is selected for engagement, the lug 946 is linearly located to push the lever 938 of the second pawl 928 to disengage it from the second ratchet wheel 924. If only the second pawl 928 is selected for engagement, the lug 946 is linearly located to push the other lever 938 to disengage the first pawl 926 from the wheel 922. (FIG. 6C.) If both pawls 926 and 928 are selected for engagement, the lug 946 will not interact with either pawl lever 938. (FIG. 6D.)

During electrical operation, the enabling mechanism 910 situates the ratchet wheels 922/924 and the pawls 926/928, and thus the ratchet-and-pawl mechanism 930, in a nonengagable posture. (FIG. 6B.) Specifically, in the illustrated embodiment, the extension of the solenoid plunger 914 causes the arms 916 to press on the pawl levers 938, thereby pivoting the pawls 926/928 away from the ratchet wheels 922/924. The location of the selection lug 946 does not affect the pivoting of the pawls 926/928 during electrical operation.

During nonelectrical operation, the enabling mechanism 910 situates the ratchet wheels 922/924 and the pawls 926/928, and thus the ratchet-and-pawl mechanism 930, in an engagable posture. (FIGS. 6C and 6D.) Specifically, the retraction of the solenoid plunger 914 releases the pawl levers 938. The selection, or deselection, of the pawls 926/928 then depends on the shaft's rotation position as tracked by the pawl-selecting mechanism 940.

If clockwise movement is required to return to the OPALOP position, the pawl-selection mechanism 940 will select the second pawl 928 for engagement (or deselect it for disengagement). (FIG. 6C.) In the illustrated embodiment, the selection lug 946 pushes on the lever 938 of the first pawl 926 causing it to pivot away from engagement with the first ratchet wheel 922. The selected second pawl 928 engages a tooth 934 of the second ratchet wheel 924. If an external force on the component 12 is clockwise towards the OPALOP position, the pawl 928 can slide along the teeth 938 to allow movement in this direction. If the external force is in the counterclockwise direction, the pawl 928 is captured in the engaged tooth 938 and prevented from movement in this direction.

When the relevant shaft is in the OPALOP position during nonelectrical operation, both pawls 926 and 928 are selected for engagement (e.g., both pawls are deselected for disengagement). (FIG. 6D.) The location of the selection lug 946 is such that it is not aligned for contact with either lever arm 938. Thus, the pawl 926 is captured in a tooth 936 in the first ratchet wheel 922 and the pawl 928 is captured in a tooth 938 in the second ratchet wheel 924. The two-pawl engagement locks the relevant shaft (and thus the component 12) in the OPALOP position.

The rotary disposition device 100 can also comprise a rotation-constraining mechanism 950 to constrain rotation of the relevant shaft (and thus the component 12) away from the OPALOP position during nonelectrical operation. The illustrated mechanism 950 comprises a hub 962, and a plurality of locking ball ramps 964 extending therethrough. When the pawl 926/928 is engaged with the respective ratchet wheel 922/924, rotational forces will cause the balls 966 to either retreat into the ramps or emerge therefrom. In the selected direction (e.g., counterclockwise in illustrated embodiment) the balls retreat thereby allowing for easy rotation in this direction. Opposite rotational forces (e.g., clockwise in the illustrated embodiment) cause the balls to egress from the ramps and tightly wedge themselves between the wheel 922/924 and the hub 962.

As was indicated above, the electromechanical apparatus 100 can be used to control the movement of a flight-control-surface component 12 (e.g., a stabilizer, rudder, elevator, flap, aileron, spoiler, slat, etc.) relative to an aircraft structure. Instead of an aircraft, the structure can be part of a missile, rocket, spacecraft, ship, submarine, torpedo, or any other vehicle (or non-vehicle) wherein motion control of a component necessary. Additionally or alternatively, the component 12 can be a nozzle-defining surface, a rudder, a hull, or any other compatible component. With particular reference to the predisposition device 900, the external force encountered by the component 12 can be a nonelectrically-motivated force such as fluid flow (e.g., gas flow, air flow, engine exhaust flow, liquid flow, water flow, fuel flow), gravity, pressure, etc. and/or it can be result of speed, environmental factors, altitude, depth, temperature, etc. The EMA assembly 100, and/or the predisposition device 900, can be used in any actuating situation where jam tolerance, fault compensation, or OPALOP positioning is desired or necessary.

Although the EMA assembly 100, the actuator 200, the drive motors 300, the drive trains 400, the couplers 500, the decoupling trains 600, the decoupling motors 700, the converters 810, and/or the predisposition devices 900 (and sub-assemblies, mechanisms, means, methods, and steps) have been shown and described with respect to a certain embodiments, it is obvious that equivalent alterations and modifications will occur to others skilled in the art upon the reading and understanding of this specification and the annexed drawings. In regard to the various functions performed by the above described (e.g., components, assemblies, mechanisms, systems, devices, compositions, etc.), the terms (including a reference to a "means") used to describe such are intended to correspond, unless otherwise indicated, to any element which performs the specified function of the described element (i.e., that is functionally equivalent), even though not structurally equivalent to the disclosed structure which performs the function. In addition, while a particular feature may have been described above with respect to only one or more of several illustrated embodiments, such feature may be combined (or not combined) with one or more other features of the other embodiments, as may be desired and advantageous for any given or particular application.

The invention claimed is:

1. An electromechanical actuating assembly comprising:
an actuator;
a first drive motor providing actuator-moving power;
a second drive motor providing actuator-moving power independent of the first drive motor;
a first drive train including a first ballscrew for transferring actuator-moving power to the actuator;
a second drive train including a second ballscrew for transferring actuator-moving power to the actuator;
a first decoupling train for transmitting decoupling power to decouple the first drive train from the actuator; and
a second decoupling train for transmitting decoupling power to decouple the second drive train from the actuator;
wherein the assembly is operable in a D1 mode, whereat actuator-moving power is transferred only through the first drive train and whereat the second drive train is decoupled from the actuator;
wherein the assembly is operable in a D2 mode, whereat actuator-moving power is transferred only through the second drive train and whereat the first drive train is decoupled from the actuator.

2. An electromechanical actuating assembly as set forth in claim 1, wherein the first drive motor is powered by a first electrical source and the second drive motor is powered by a second electrical source.

3. An electromechanical actuating assembly as set forth in claim 1, wherein the assembly is operable in a normal-operation mode, whereat actuator-moving power is transferred to the actuator through both the first drive train and the second drive train.

4. An electromechanical actuating assembly as set forth in claim 1, wherein, when the assembly is in the normal-operation mode, the first drive motor provides actuator-moving power to the first drive train and the second drive motor provides actuator-moving power to the second drive train.

5. An electromechanical actuating assembly as set forth in claim 1, further comprising a first coupler coupling the first drive train to the actuator, and a second coupler coupling the second drive train to the actuator;
   wherein the first decoupling train decouples the first coupler when decoupling power is transmitted therethrough and the second decoupling train decouples the second coupler when decoupling power is transmitted therethrough.

6. An electromechanical actuating assembly as set forth in claim 1, wherein the first drive motor is powered by a first electrical source and the second drive motor is powered by a second electrical source;
   wherein the assembly is operable in a normal-operation mode, whereat actuator-moving power is transferred to the actuator through both the first drive train and the second drive train; and
   wherein, when the assembly is in the normal-operation mode, the first drive motor provides actuator-moving power to the first drive train and the second drive motor provides actuator-moving power to the second drive train.

7. An electromechanical actuating assembly as set forth in claim 1, wherein decoupling power is not provided by the first drive motor or the second drive motor.

8. An electromechanical actuating assembly as set forth in claim 7, wherein a first decoupling motor provides decoupling power to the first decoupling train and wherein a second decoupling motor provides decoupling power to the second decoupling train.

9. An electromechanical actuating assembly as set forth in claim 1, wherein at least one of the first drive motor and the second drive motor provide the decoupling power.

10. An electromechanical actuating assembly as set forth in claim 9, further comprising:
    a first drive-decouple converter that converts between a drive condition, whereat the first drive motor is drivingly connected to the first drive train, and a decouple condition, whereat this motor is drivingly connected to the first decoupling train; and
    a second drive-decouple converter that converts between a drive condition, whereat the second drive motor is drivingly connected to the second drive train, and a decouple condition, whereat this motor is drivingly connected to the second decoupling train.

11. An electromechanical actuating assembly as set forth in claim 10, wherein the drive-decouple converters each comprise a clutch.

12. An electromechanical actuating assembly as set forth in claim 10, wherein the drive-decouple converters each comprise a solenoid switch.

13. An electromechanical actuating assembly as set forth in claim 12, wherein each solenoid switch is energized when its drive-decouple converter is in the drive condition.

14. An electromechanical actuating assembly as set forth in claim 12, wherein each solenoid switch is energized when its drive-decouple converter is in the decouple condition.

15. An electromechanical actuating assembly as set forth in claim 1, further comprising predisposition device for mechanically moving the actuator to an optimum position after loss of power (OPALOP) after loss of power to both motors.

16. An electromechanical actuating assembly as set forth in claim 1, and a movable component attached to the actuator, wherein the movable component moves in response to actuator-moving power provided to the actuator.

17. A vehicle comprising a control-surface component and an electromechanical actuating assembly as set forth in claim 1, wherein the control-surface component is attached to the actuator, and wherein the control-surface component moves in response to actuator-moving power being provided to the actuator.

18. An electromechanical actuating assembly comprising:
   an actuator movable to a plurality of positions, one of these positions being an optimum position after loss of power (OPALOP) position;
   an electric motor drive for providing actuator-moving power;
   a drive train system for transferring actuator-moving power from the electric motor drive to the actuator to move it among the plurality of positions during electrical operation;
   a predisposition device enabled during nonelectrical operation to prevent movement of the actuator in a direction away from the OPALOP position and to allow movement of the actuator in a direction towards the OPALOP position, the predisposition device including a pair of ratchet and pawl mechanisms arranged in opposition to one another, each ratchet and pawl mechanism defining a plurality of position stops configured to allow movement of the actuator toward the OPALOP position while restricting return movement of the actuator to the last passed stop, whereby any externally forced movement of the actuator in opposite directions will progressively bring the actuator to the OPALOP position.

* * * * *